July 27, 1937.  A. L. VOIGHT  2,088,074
COOKING UTENSIL
Filed Feb. 12, 1936
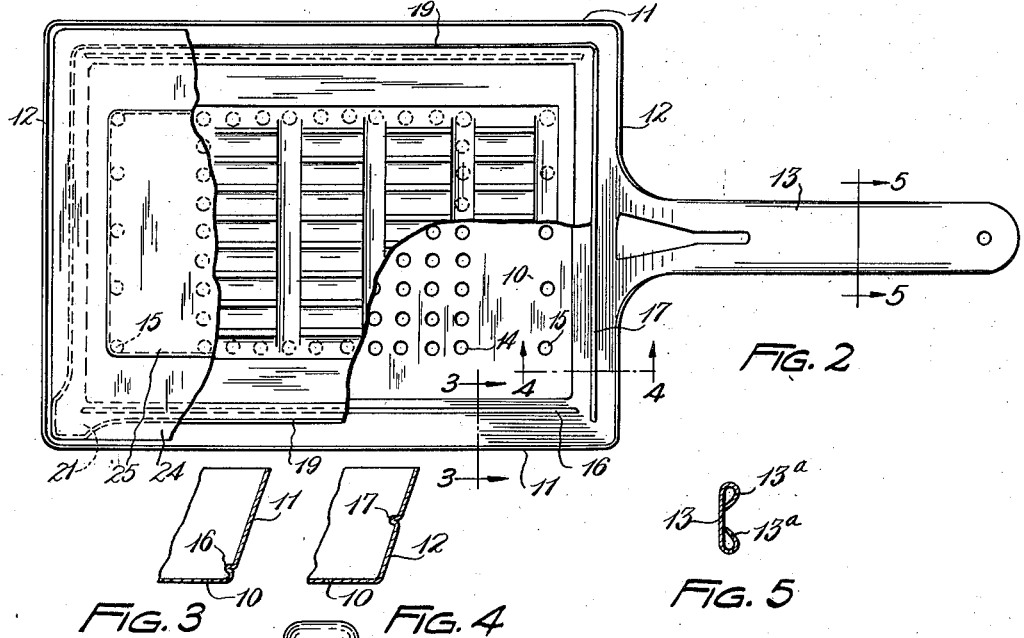
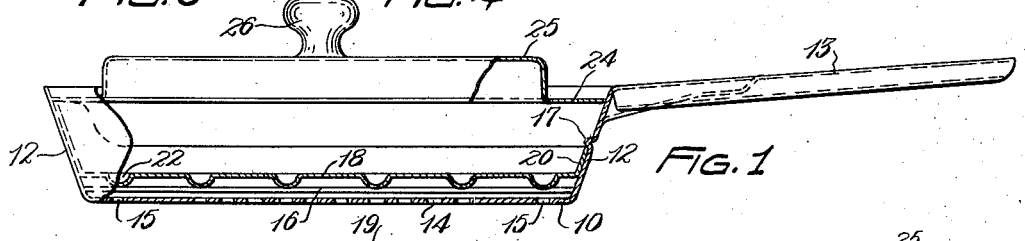
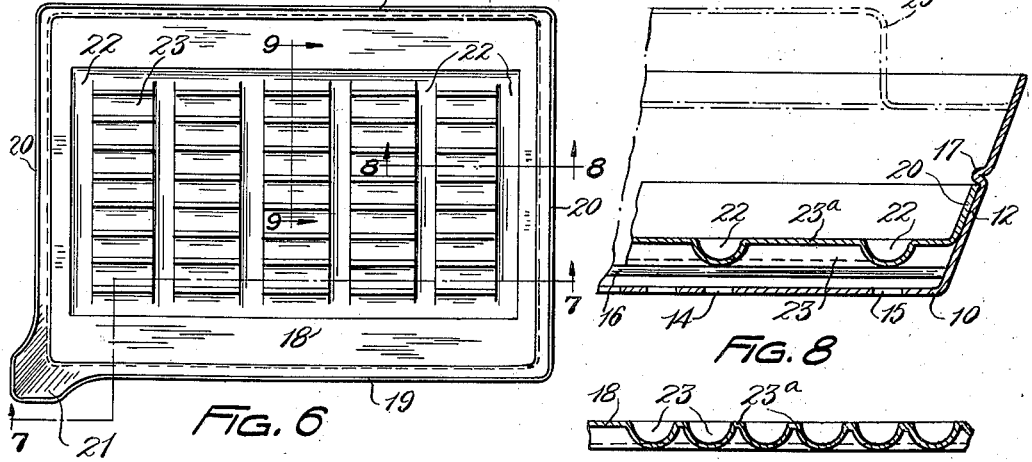
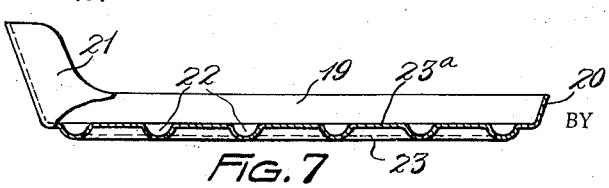
INVENTOR.
AUGUST L. VOIGHT
BY
Kirs Hudson & Kent
ATTORNEYS Patented July 27, 1937

2,088,074

UNITED STATES PATENT OFFICE 2,088,074

COOKING UTENSIL

August L. Voight, Cleveland, Ohio

Application February 12, 1936, Serial No. 63,565

5 Claims. (Cl. 53—5)

This invention relates to a cooking utensil, and particularly to a cooking utensil for cooking meats, fowl, game, fish, potatoes and the like, although it will be understood that the utensil is susceptible of other uses.

An object of the invention is to provide a cooking utensil which is efficient and which may be economically manufactured and readily handled.

Another object is to provide a cooking utensil in which meats, fowl, game, fish and the like may be correctly cooked to a full flavored, tender and easily digested condition.

A further object is to provide a cooking utensil in which meats, fowl, game, fish and the like may be cooked correctly and the juices or essences therefrom can be collected and saved in the utensil for use.

A further object is to provide a cooking utensil, such as above specified, which may be employed upon the top of the stove or upon an open fire.

Another object is to provide a cooking utensil which is so constructed that its use effects a saving in fuel.

A further object is to provide a cooking utensil wherein meats, fowl, game, fish and the like may be cooked and the use of the utensil does not require the lighting of an oven, hence eliminates an overheated kitchen and large fuel bill.

Further and additional objects and advantages not hereinbefore specified, will become apparent hereinafter during the following detailed description of an embodiment of the invention which is illustrated in the accompanying drawing.

Referring to the accompanying drawing,

Fig. 1 is a side elevational view of the utensil with certain of the parts broken away and shown in vertical section.

Fig. 2 is a top plan view of the utensil with part of the cover and inner pan broken away.

Fig. 3 is a fragmentary detail vertical sectional view taken substantially on line 3—3 of Fig. 2 looking in the direction of the arrows.

Fig. 4 is a fragmentary detail vertical sectional view taken substantially on line 4—4 of Fig. 2 looking in the direction of the arrows.

Fig. 5 is a detail sectional view through the handle and is taken substantially on line 5—5 of Fig. 2 looking in the direction of the arrows.

Fig. 6 is a top plan view of the inner pan of the utensil.

Fig. 7 is a vertical sectional view through the pan and is taken substantially on line 7—7 of Fig. 6 looking in the direction of the arrows.

Fig. 8 is a fragmentary vertical sectional view and is taken substantially on line 8—8 of Fig. 6 looking in the direction of the arrows, and Fig. 9 is a fragmentary sectional view taken substantially on line 9—9 of Fig. 6 looking in the direction of the arrows.

The utensil may be formed either from cast metal, glass or from sheet metal stamped into the desired shape. The utensil comprises a preferably rectangular outer pan having a bottom 10 and upwardly extending outwardly flared side walls 11 and end walls 12. A suitable handle 13 extends laterally from the upper edge of one of the side walls 12, and said handle is provided on its underside with inwardly turned or rolled beads 13a strengthening the handle and, due to the air space formed by the beads, assisting in maintaining the handle in a cool and usable condition during the use of the utensil. The bottom 10 of the outer pan is provided adjacent its central portion with a plurality of closely spaced rows of openings 14, so that when the pan is placed over a fire, such as a gas burner, the flames can come through the openings 14 into the interior of the pan. The bottom 10 is also provided adjacent each end wall 12 with a row of holes 15, see Figs. 1 and 2, said holes or openings 15 being so located as not to be directly over the flame, and acting as vent openings for the flames to prevent the smoking or sooting of the pan.

Each side wall 11 is provided a slight distance above the bottom 10 with an inwardly extending bead or ledge 16 that runs substantially the full longitudinal length of the side walls. The end wall 12 from which the handle 13 extends is provided substantially midway of its vertical side with an inwardly projecting bead or ledge 17 extending transversely of the pan, as clearly shown in Figs. 1, 2, and 4.

The inner pan of the utensil is provided with a bottom wall 18, side walls 19 and end walls 20, said side and end walls extending upwardly from the bottom wall and being outwardly flared at substantially the same angle as are the walls 11 and 12 of the outer pan, whereby the inner pan can be nested within the outer pan.

At one corner of the inner pan the end wall 20 and side wall 19 (the lower left hand corner as viewed in Fig. 6) are extended upwardly and formed so as to provide a substantially V-shaped spout, funnel or trough 21, for a purpose later to be clearly apparent. The bottom 18 of the inner pan is provided with a plurality of parallel transversely extending grooves or troughs 22 and with a plurality of parallel spaced longitudinally extending grooves 23, communicating with the grooves 22, it being noted that the spaces 23a between the grooves 23 are flattened and provide a grid upon which may rest the edible being cooked in the pan.

The inner pan, as previously stated, is of such size and shape that it can be nested within the outer pan and when so nested the bottom side of the grooves or troughs 22 engage the longitudinally extending ledges 16 of the outer pan and support the inner pan a slight distance above the bottom 10 of the outer pan.

It will also be noted that the upper edge of the end wall 20 of the inner pan that is remote with respect to the spout 21 engages beneath the ledge or shelf 17 of the end wall 12 of the outer pan, wherefore said shelf acts to hold the inner pan in position in the outer pan. A cover 24 is provided for the utensil and has a centrally located raised portion 25 at the middle point to the upper side of which is attached a lifting knob 26. The cover 24 is of such size that it fits into the open upper end of the outer pan a slight distance below such open end, and due to the size of the cover and the flared or tapered walls of the outer pan is tightly held in position.

In using the utensil for cooking meats, such as steaks, chops or the like, fowl, such as chicken, fish or game, the inner pan is positioned, as previously explained, in the outer pan and a small amount of water is poured into the inner pan. The utensil is then placed on top of the fire and allowed to warm. The edible to be cooked is then placed in the inner pan upon the grid formed by the spaces 23a and the cover 24 positioned in the open end of the outer pan. The small amount of water which has been placed in the inner pan will first steam the outer sides of the edible article making it tender, and after the water has evaporated the edible article will be broiled on the grid to the amount desired, it being understood that such article should be turned to have both sides properly broiled. The initial steaming of the article makes it tender, and results, when the same is finally cooked, in rendering it easily digestible. Due to the fact that the bottom 10 of the outer pan is provided with the perforations 14, the flames extend into the space between the outer and inner pan, and are trapped therein thus concentrating the entire heat value of the flame against the inner pan.

The utensil can be used upon the top of the stove or over an open fire, and because of this fact and also the trapping of the flames between the outer and inner pans, a large saving in fuel cost will result. The juices or essences from the edible article being cooked in the utensil run off into the grooves 22 and 23 and when the article has been removed from the utensil said juices can be poured therefrom by means of the spout 21, the ledge 17 retaining the inner pan in the outer pan during the tilting of the utensil.

It will be understood, of course, that suitable fats, such as oil, lard, or butter, may be placed in the pan when it is desired to fry the edible article rather than broil the same.

Although a preferred embodiment of the invention has been illustrated and described herein, it will be understood that the invention is susceptible of various modifications and adaptations within the scope of the appended claims.

Having thus described my invention I claim:

1. A cooking utensil comprising an outer pan having its side walls provided with ledges spaced above the bottom of the pan and with one of its end walls provided with a ledge spaced above the ledges on the side walls, and an inner pan nested within said outer pan and supported on the ledges of the side walls and having the upper edge of one of its end walls engaging beneath the ledge on the end wall of the outer pan.

2. A cooking utensil comprising an outer pan and an inner pan nested within the outer pan, said inner pan having its bottom provided with a plurality of series of parallel spaced troughs with the troughs of one series intersecting the troughs of another series.

3. A cooking utensil comprising an outer pan having its bottom provided with a plurality of openings and its side walls provided with ledges spaced above the bottom, and an inner pan nested within said outer pan and having an imperforate bottom provided with a plurality of parallel spaced troughs which bear upon said ledges and support the inner pan with its bottom above the bottom of the outer pan.

4. A cooking utensil comprising an outer pan having its side walls provided with ledges spaced above the bottom of the pan and with one of its end walls provided with a ledge spaced above the ledges on the side walls, and an inner pan nested within said outer pan and having its bottom provided with a plurality of parallel spaced troughs bearing on the ledges of the side walls and having the upper edge of one of its end walls engaging beneath the ledge in the end wall of the pan.

5. A cooking utensil comprising an outer pan having its bottom provided with a plurality of openings and its side walls provided with ledges spaced above the bottom of the pan and one of its end walls provided with a ledge spaced above the ledges on the side walls, and an inner pan nested within said outer pan and having its bottom provided with a plurality of series of parallel troughs with the troughs of one series intersecting the troughs of another series, the troughs of one series bearing upon the ledges of the side walls and supporting the bottom of the inner pan above the bottom of the outer pan, said inner pan having the upper edge of one of its end walls engaging beneath the ledge on the end wall of the outer pan.

AUGUST L. VOIGHT.